J. C. Henderson,
Stove.
No. 1,506. Reissued June 30, 1863.
Fig. 1
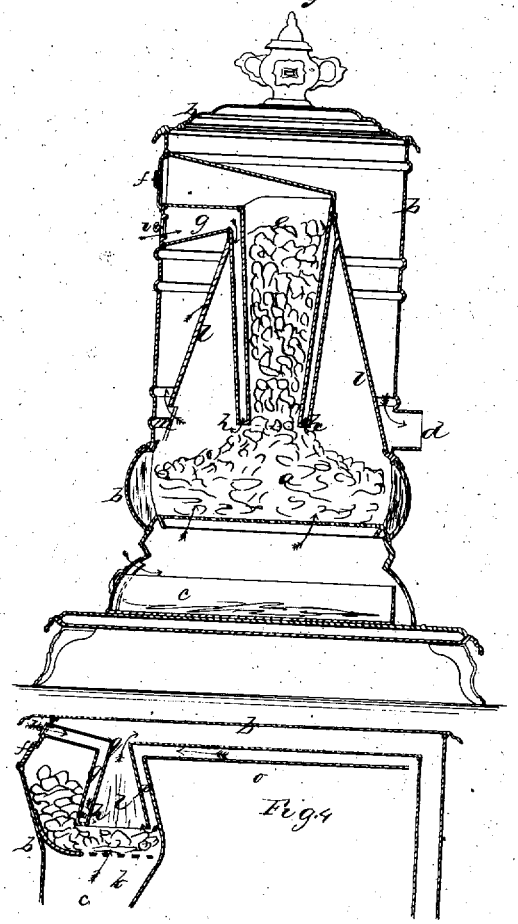
Fig. 2
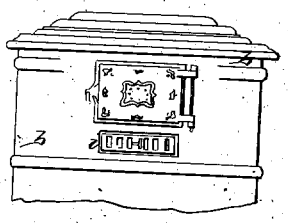
Fig. 3.
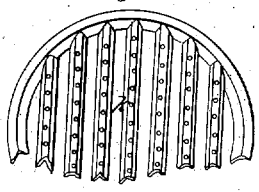
Fig. 4
Witnesses.
Samuel W. Spaulding
Charles H. Smith
Inventor
J. C. Henderson

UNITED STATES PATENT OFFICE.

JOSEPH C. HENDERSON, OF ALBANY, NEW YORK.

IMPROVEMENT IN STOVES.

Specification forming part of Letters Patent No. 28,482, dated May 29, 1860; Reissue No. 1,506, dated June 30, 1863.

*To all whom it may concern:*

Be it known that I, JOSEPH C. HENDERSON, of the city and county of Albany, in the State of New York, have invented, made, and applied to use certain new and useful Improvements in Stoves; and I do hereby declare that the following is a full, clear, and exact description of the construction and operation of the same, reference being had to the annexed drawings, making part of this specification, wherein—

Figure 1 is a vertical section of my improved stove. Fig. 2 is a front elevation of a portion of the same. Fig. 3 is a plan of the grate.

Similar marks of reference denote the same parts.

Several instances are known of in which the fuel has been placed in a hopper or receptacle above the grate, so as to supply the fire as the coal was consumed. Such a plan is particularly advantageous in preventing the fire being deadened by too much coal put on at one time, and also as preventing the fire burning out too fast from lack of fuel. In all instances, however, with which I am acquainted one of two difficulties or both arise—viz., the fuel ignites in the hopper or receptacle from the great heat and confined position, or else the gases passing off from the mass are not perfectly consumed, because they are not retained in contact with the heat of the fire to produce perfect combustion.

The nature of my said invention consists in a hopper that is located above the fire-pot, and supplies coal to the fire, and over the fire and around the base of the hopper a chamber is formed in which the gases are detained and subjected to sufficient heat to produce a perfect combustion; and I make use of a circulating current of air around the hopper to keep the fuel as cool as possible and prevent combustion in the hopper, and I introduce a current of air through the hollow lower edge of the hopper to effect the twofold operation of keeping the hopper cool and preventing it burning out at this point, and of supplying a hot-blast to the fire at the surface of the incandescent fuel to promote a perfect combustion of the gases evolved from the said fuel.

In the drawing, *a* is the fire pot, *b* the casing or plates, *c* the ash drawers, and *d* the escape or smoke pipe, all of which may be of any desired size, shape, or character.

*e* is a hopper, into which the fuel is placed.

*f* is the supply-door for the fuel.

*g* is an air-space between said hopper and the fire, terminating at the openings *h h*, and *i* is a register to admit a regulated supply of air to the fire through said space.

I have represented my hopper *e* as circular or conical and directly over the center of the grate *k*; but it will be evident that the shape of this hopper might vary according to the character of stove. In all instances the air in passing around the hopper acts to keep the said fuel as cool as possible, and by carrying said air into the fire in a heated state the combustion becomes more perfect, because said heated air comes directly in contact with the gaseous matters evolved from and rising above the fuel.

The cone *l* introduced around my hopper forms a combustion-chamber or horizontal flue, the object of this being to retain the gases in the presence of the fire heat, and insure a perfect combustion, similar to that set forth in my patent of May 18, 1858.

By this mode of supplying fuel I avoid many difficulties that arise, particularly with soft coal in stoves, wherein it has been found practically that a supply of fresh coal deadens the fire, the parts become cool, the gaseous matters thrown off, instead of inflaming, are in the form of smoke, condensing on and becoming thick soot around the stove, and when these matters are thrown off and the fire commences to burn briskly the stove is apt to be forgotten until the coal is almost consumed, and then a fresh supply repeats the difficulty, and, with anthracite coal, the addition of considerable at one time is apt, on account of the heat acting on the whole mass, to evolve sulphurous fumes, which are detrimental to health, and all benefits from the same in combustion are lost.

By the use of my feeder and air-supply all the foregoing difficulties are entirely removed and the fire kept constant and uniform with either soft or hard coal, and all loss of gaseous matters or obstruction to the stove are prevented, and the addition of large quantities of coal at one time does not dampen, check, or obstruct the fire.

The grate *k* is formed of a series of hollow triangular bars, as shown in Fig. 3, there being a row of holes in each bar, the object being to prevent the grate becoming heated and burned out, and preventing the obstruction of the draft by ashes, for the ashes settle down between the bars on the inclined sides of the same, protecting the grate, while the air passes through the holes at the top of the bar into the fire, and said draft is heated by contact with said grate-bar in passing through it.

If the air-space *g* was dispensed with and fire-brick substituted, the operation of the parts would be analogous if air were admitted within the chamber above the fire from some other opening.

In Fig. 4 I have represented the mode in which I have contemplated the application of my invention to cooking-stoves. In this case the operation of each part corresponds with that of the parts in Figs. 1 and 2, having the same letters of reference, and *o o* represent the oven, and *p* an air-space between the oven and the fire.

The great advantage of this invention, as applied to the furnace of a cooking-stove, range, heater, or boiler of any character will be apparent, for the soft coal, (with which my invention is especially useful,) being contained in the hopper *e*, gradually passes into the fire and heats and cokes and the gaseous products pass off therefrom into the chamber over the incandescent fuel, and, being detained in said chamber immediately in contact with the fire, are thoroughly combined with the oxygen of the air and inflamed, so that no smoke passes away, only the gaseous products of a perfect combustion. The coal will fall or may be pushed down from time to time as the fire burns away, and the fresh coal added does not cool the stove or deaden the fire, but there is a uniform combustion and steady heat, free from the smoke and soot heretofore existing where soft coal was used.

It will be seen that my present invention is an improvement on that set forth in my patent of May 18, 1858.

What I claim, and desire to secure by Letters Patent, is—

1. A reservoir or hopper contracted at its lower end to contain and supply fuel, in combination with a fire-pot separate from said reservoir, and to which the coal is supplied at or near the center, so that the products of combustion pass away from the surface of the fire around the contracted base of the said hopper, substantially as specified.

2. A chamber or horizontal flue around the base of the reservoir or hopper supplying coal, and over the surface of the fire, to receive and detain the products of combustion in contact with the fire heat until perfectly consumed, as set forth.

3. A contracted outlet or opening from the said chamber or horizontal flue, formed as aforesaid, to prevent a too rapid escape of the products of combustion, as specified.

4. The surrounding case *b*, in combination with the said hopper, fire-pot, and chamber above the fire, for receiving the products of combustion from the said chamber and radiating heat, substantially as set forth.

5. In combination with a hopper over the fire, a circulating current of air surrounding such hopper to aid in cooling the fuel in said hopper, substantially as specified.

6. The supply-door *f* and the register *i*, in combination with the hopper *e* and draft-space *g*, as set forth.

7. A circulating current of air passing through the hollow lower end of the supply-hopper and entering the combustion-chamber over the fire for promoting combustion and keeping the hopper from injury by heat, as set forth.

In witness whereof I have hereunto set my signature this 22d day of April, A. D. 1863.

J. C. HENDERSON.

Witnesses:
LEMUEL W. SERRELL,
CHAS. H. SMITH